US007702728B2

(12) United States Patent
Zaner et al.

(10) Patent No.: US 7,702,728 B2
(45) Date of Patent: Apr. 20, 2010

(54) MOBILE SHARED GROUP INTERACTION

(75) Inventors: Melora Zaner, Seattle, WA (US);
Eun-Kyung Chung, Redmond, WA (US); Kathleen Mulcahy, Seattle, WA (US); Cesare John Saretto, Seattle, WA (US); Asta Roseway, Redmond, WA (US); Tammy Savage, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1580 days.

(21) Appl. No.: 10/769,425

(22) Filed: Jan. 30, 2004

(65) Prior Publication Data

US 2005/0172001 A1 Aug. 4, 2005

(51) Int. Cl.
*G06F 15/16* (2006.01)
(52) U.S. Cl. .................................. 709/205; 715/758
(58) Field of Classification Search ................... 709/205
See application file for complete search history.

(56) References Cited

U.S. PATENT DOCUMENTS

| 5,500,929 | A | * | 3/1996 | Dickinson | 715/853 |
|---|---|---|---|---|---|
| 5,781,193 | A | * | 7/1998 | Alimpich et al. | 715/810 |
| 5,793,365 | A | * | 8/1998 | Tang et al. | 715/758 |
| 5,818,444 | A | * | 10/1998 | Alimpich et al. | 715/765 |
| 5,832,473 | A | * | 11/1998 | Lee et al. | 707/2 |
| 6,430,604 | B1 | | 8/2002 | Ogle et al. | |
| 6,636,889 | B1 | | 10/2003 | Estrada et al. | |
| 6,654,790 | B2 | | 11/2003 | Ogle et al. | |
| 6,950,982 | B1 | * | 9/2005 | Dourish | 715/234 |
| 7,127,501 | B1 | * | 10/2006 | Beir et al. | 709/219 |
| 7,330,845 | B2 | * | 2/2008 | Lee et al. | 707/2 |
| 2002/0165024 | A1 | * | 11/2002 | Puskala | 463/40 |
| 2004/0268341 | A1 | * | 12/2004 | Kenworthy | 717/174 |
| 2008/0033959 | A1 | * | 2/2008 | Jones | 707/9 |
| 2008/0168138 | A1 | * | 7/2008 | Simpson | 709/204 |

OTHER PUBLICATIONS

Collaborative Platform for fixed and mobile networks Federico Bergenti, Matteo Samacher Nov. 2002/vol. 45, No. II Communicaitons of the ACM; http://delivery.acm.org/10.1145/590000/581591/p39-bergenti.pdf?key1=581591&key2=6516932421&coll=GUIDE&dl=GUIDE&CFID=35768773&CFTOKEN=57007286.*
Delivery Context Overview for Device Independence W3C Working Draft; Dec. 13, 2002 http://www.w3.org/TR/2002/WD-di-dco-20021213/#user.*
Adapting Content for Mobile Devices in Heterogeneous Collaboration Environments Sangmi Lee1, 2, Sunghoon Ko1, Geoffrey Fox 1, 3 Community Grid Computing Labs, Indiana University 1 Department of Computer Science, Florida State University2, Department of Computer Science, Indiana University 3 slee@csit.fsu.edu, {suko, gcf}@indiana.edu; 2002.*

(Continued)

*Primary Examiner*—Kenny S Lin
*Assistant Examiner*—Tauqir Hussain
(74) *Attorney, Agent, or Firm*—Lee & Hayes, PLLC

(57) ABSTRACT

Techniques for enabling mobile shared group interaction are described. Members of a group may access, through a user interface, group activities that provide a shared, synchronous, interactive experience. An interface may be provided via a mobile device such as a cellular telephone that enables members who are mobile to participate in group activities with other members who are also mobile or who are logged on via a non-mobile device such as a desktop computer system.

20 Claims, 14 Drawing Sheets

OTHER PUBLICATIONS

Mobile Access Activity Statement The Mobile Access Activity is merged into the Device Independence Activty. Last modified $Date: Jul. 3, 2001 15:51:45 $ http://www.w3.org/Mobile/Activity.*

U.S. Appl. No. 10/230,247, Zaner et al., filed Aug. 28, 2002, entitled, "System and Method for Shared Integrated Online Social Interaction".

U.S. Appl. No. 10/174,422, Zaner et al., filed Jun. 18, 2002, entitled, "Visual Group Interface for Group Connectivity".

Smith, Marc A., et al., "The Social Life of Small Graphical Chat Spaces," In Proceedings of CHI 2000, The Hague, Netherlands, http://research.microsoft.com/scg/papers/vchatchi2000.pdf (Mar. 2000) pp. 1-8.

Cheng, Lili, et al., "Hutchworld: Lessons Learned. A Collaborative Project: Fred Hutchinson Cancer Research Center & Microsoft Research," In Proceedings of Virtual Worlds Conference 2000, Paris, France, http://research.microsoft.com/scg/papers/hutchvw2000.pdf, (Jun. 2000) pp. 1-12.

Kollock, Peter, "The Economics of Online Cooperation: Gifts and Public Goods in Cyberspace," Communities in Cyberspace, 1998, http://sscnet.ucla.edu/soc/faculty/kollock/papers/economies.htm, pp. 1-17.

Kollock, Peter, et al., "Managing the Virtual Commons: Cooperation and Conflict in Computer Communities," University of California, Los Angeles, http://research.microsoft.com/scg/papers/KollockCommons.htm (1996), pp. 1-20.

Smith, Marc, et al., "What Do People Do in Virtual Worlds? An Analysis of V-Chat Log File Data," University of California, Los Angeles, http://research. microsoft.com/scg/papers/kollockv-chat.pdf, (1998) pp. 1-30.

Farnham, Shelly, et al., "Supporting Sociability in a Shared Browser," In Proceedings of Interact Conference, Tokyo, Japan, http://research.microsoft.com/scg/papers/sharedbrowsinginteract.pdf (Jul. 2001) pp. 1-8.

Hong, et al.; "Session Initiation Protocol and Web Services for Next Generation Multimedia Applications"; Proceedings of the IEEE Fourth International Symposium on Multimedia Software Engineering (MSE'02); 2002; pp. 70-80.

Mitsuoka, et al; "Instant Messaging with Mobile Phones to Support Awareness"; Proceedings 2001 Symposium on Applications and the Internet; 2001; pp. 223-230.

* cited by examiner

MOBILE SHARED GROUP INTERACTION

TECHNICAL FIELD

This invention relates to electronic communication, and more specifically to enabling a shared group interaction experience including a mobile group member, and at least one other mobile or non-mobile group member.

BACKGROUND

With technological advances have come many changes in the ways that people communicate with one another. For example, affordable home computing systems and the Internet have made instant messaging a popular tool for engaging in one-on-one, real-time electronic communications. Cellular telephones have also emerged as a prevalent fixture in our society, keeping even the most mobile users in touch with others.

These technological advances have led to changes in the way individuals communicate with each other in one-on-one conversations. However, many people, especially teenagers and young adults, frequently participate in group social situations involving more than just one other person. Although cellular telephones can enable conference calls with three or more individuals and instant messaging applications allow additional individuals to be invited to join a particular conversation, there are no existing applications that are designed to enable group social interactions in ways that are consistent with face-to-face group social interactions. Face-to-face group social interactions may include several simultaneous activities such as talking, listening to music, and looking at pictures. For example, if several individuals meet together at a person's house, they may simultaneously listen to a music CD, talk, and look at pictures from a trip that one of the individuals recently took. All of the individuals are able hear the music, view the pictures, and comment on the pictures to one another at the same time.

Most existing communication mechanisms allow for multiple individuals to communicate, for example through instant messaging, but require that the communication application be specifically configured for the group each time. That is, for instant messaging, each individual to be included in a conversation has to be specifically invited to join. Furthermore, existing communication mechanisms are designed to be accessed from either a desktop computer system or from a cellular telephone. There are no existing systems that enable communication between multiple members of a group where some of the group members are using a mobile device (e.g., a cellular telephone) and other group members are using a non-mobile device (e.g., a desktop computer system).

Accordingly, a need exists for a mechanism that facilitates real-time synchronous group interaction that includes mobile group members.

SUMMARY

A technique is described for enabling a shared group interaction experience including a mobile group member as well as another mobile or non-mobile group member. A user can belong to one or more groups, where each group includes one or more other members. When a user is logged on, other members of the user's groups are able to see presence information that indicates that the user is online, and whether or not the user is connected via a mobile device (e.g., a cellular telephone).

A user interface is provided for a mobile device that enables a user to participate in real-time social group interactions with other group members who may be connected via another mobile device or via a non-mobile device (e.g., a desktop computer system).

DETAILED DESCRIPTION

Overview

The embodiments described below provide techniques for enabling mobile shared group interaction. An application running on a mobile device (e.g., a cell phone) provides an interface through which a user can participate in synchronous, shared group activities (e.g., group instant messaging, image sharing, audio sharing, etc.). Other group members may participate in the shared group activities via another mobile device or via a non-mobile device (e.g., a personal computer) running an application that provides a similar user interface.

In an exemplary implementation, some group activities may be accessible by all group members; other group activities may be available only to those group members who are connected via a non-mobile device; and other group activities may be available only to those group members who are connected via a mobile device. For example, due to bandwidth constraints or mobile device memory limitations, a group file sharing activity may not be available to mobile group members. Similarly, an activity that enables group members to participate in a treasure hunt game may only be applicable to members who are connected via a mobile device.

Furthermore, support for some group activities may be implemented and/or presented differently on a mobile device as compared to on a non-mobile device. For example, to reduce bandwidth and memory requirements, a group photo sharing activity may automatically reduce the size of an image that is being transmitted to mobile group members.

In an exemplary implementation, a mobile group interaction user interface has limited structure and limited rules, thereby enabling a social group interaction that is equally controlled by each group member. For example, all members of any given group have equal authority regarding activities that the group can participate in, who can be invited to join the group, what icon and name are used to represent the group, and so on. In this way, a group is designed to mimic a face-to-face social group interaction in that all group members have the ability to participate in the group to the level they desire. Furthermore, no group member has the ability to remove another member from the group. Members can invite others to join the group and each member has the ability to leave a group.

Enabling online group social interactions is described in U.S. patent application Ser. No. 10/174,422, filed Jun. 18, 2002, entitled "Visual Group Interface for Group Connectivity", and assigned to Microsoft Corporation, and U.S. patent application Ser. No. 10/230,247, filed Aug. 28, 2002, entitled "System and Method for Shared Integrated Online Social Interaction", also assigned to Microsoft Corporation, both of which are hereby incorporated by reference in their entirety.

Network Environment

Figure 1:
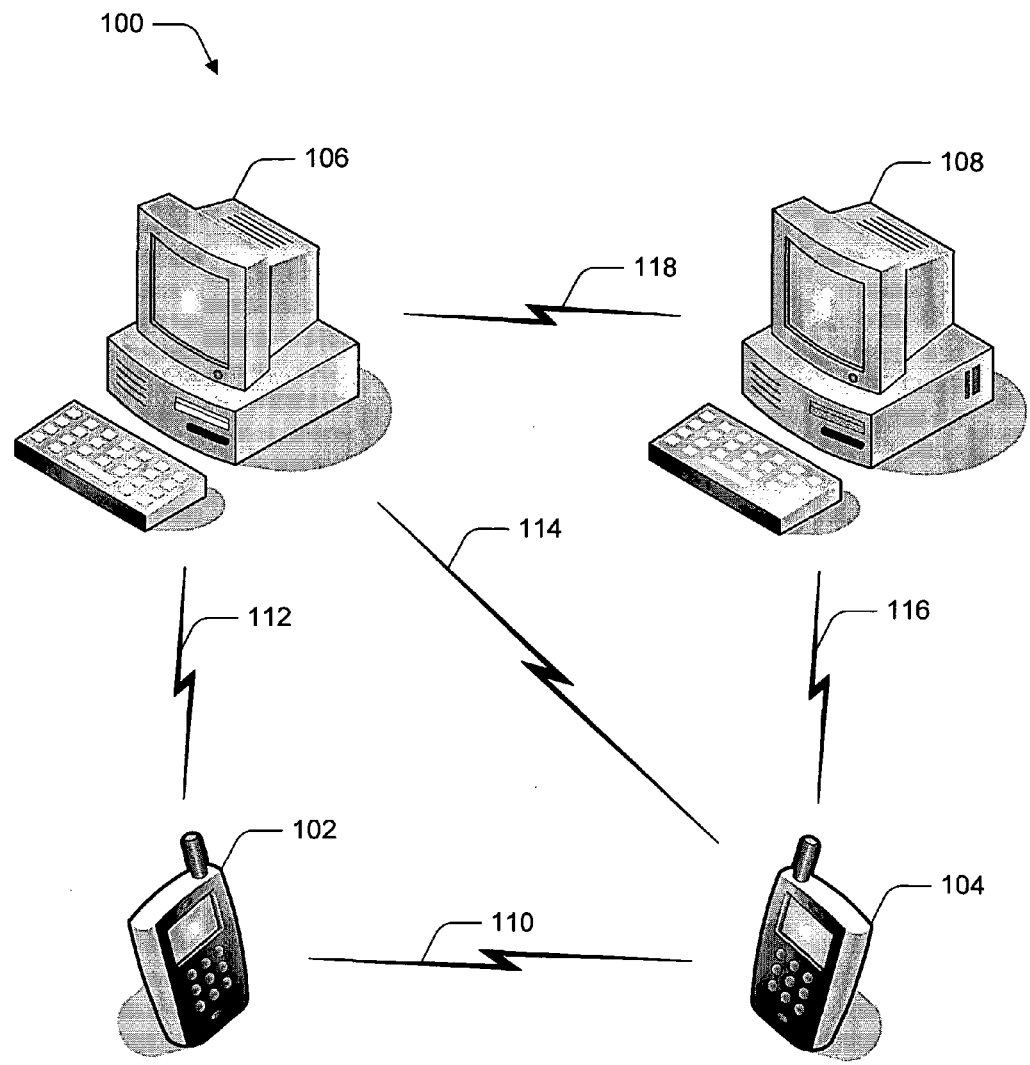
FIG. 1 is a schematic diagram that illustrates an exemplary peer-to-peer network environment that supports mobile shared group interaction.

FIG. 1 illustrates an exemplary network environment 100 via which mobile shared group interaction may be enabled. Environment 100 includes mobile device 102, mobile device 104, non-mobile device 106, and non-mobile device 108. In the illustrated example, users of mobile device 102, mobile device 104, and non-mobile device 106 all belong to a particular group, as indicated by connections 110, 112, and 114. Similarly, users of mobile device 104, non-mobile device 106, and non-mobile device 108 all belong to another group, as indicated by connections 114, 116, and 118. In an exemplary implementation, connections 110, 112, 114, 116, and 118 are peer-to-peer connections that directly link the respective devices. In alternate implementations, other types of network connections may be used, such as server-based connections.

Although FIG. 1 illustrates mobile devices 102 and 104 as cellular telephones and non-mobile devices 106 and 108 as desktop computer systems, any device that can be configured to support real-time peer-to-peer connections and run an application that provides a group interaction user interface can be implemented as a component of network environment 100. For example, other types of mobile devices that may be configured as part of environment 100 include, but are not limited to, a personal digital assistant (PDA), a car stereo, a portable television, a portable DVD player, a portable stereo (e.g., a boombox), a digital picture frame, a watch, digital jewelry (e.g., a bracelet or pendant), and so on. Other types of non-mobile devices that may be configured as part of environment 100 include, but are not limited to, a laptop computer, a television set, a DVD player, a cable television system set-top box, and a digital video recorder.

Exemplary Mobile Device

Figure 2:
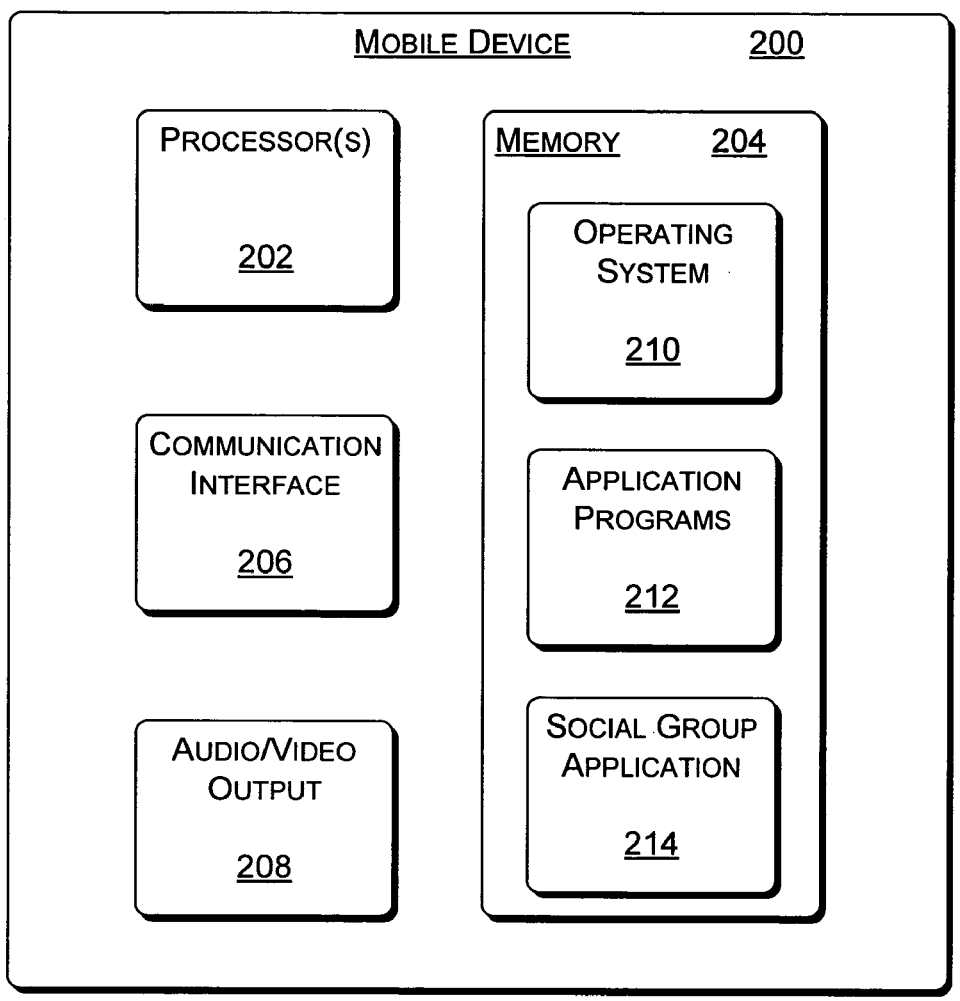
FIG. 2 is a block diagram that illustrates select components of an exemplary mobile device configured to support mobile shared group interaction.

FIG. 2 illustrates select components of an exemplary mobile device 200. As described above, mobile device 200 can be implemented in any number of embodiments, for example, as a cellular telephone, a portable television, a portable DVD player, and so on. Exemplary mobile device 200 includes one or more processors 202, a memory 204, a communication interface 206, and audio and/or video output 208.

Processor 202 is configured to perform any operations as required by mobile device 200. For example, if configured as a cellular telephone, processor 202 includes telephone processors that enable communications to be transferred over a cellular telephone network. Operating system 210 and application programs 212 are stored in memory 204 and executed on processor 202. Application programs 212 may include any type of firmware or software that can be executed using processor 202 to enable a particular functionality on mobile device 200. Example application programs may include an address book application and one or more games.

Social group application 214 is a particular application program that may be stored in memory 204 and executed on processor 202. Social group application 214 provides a user interface that enables a user of mobile device 200 to participate in real-time social interactions with other members of a group who are geographically distributed. An example user interface and social activities that may be supported by social group application 214 are described below.

Mobile Device User Interface

Figure 3:
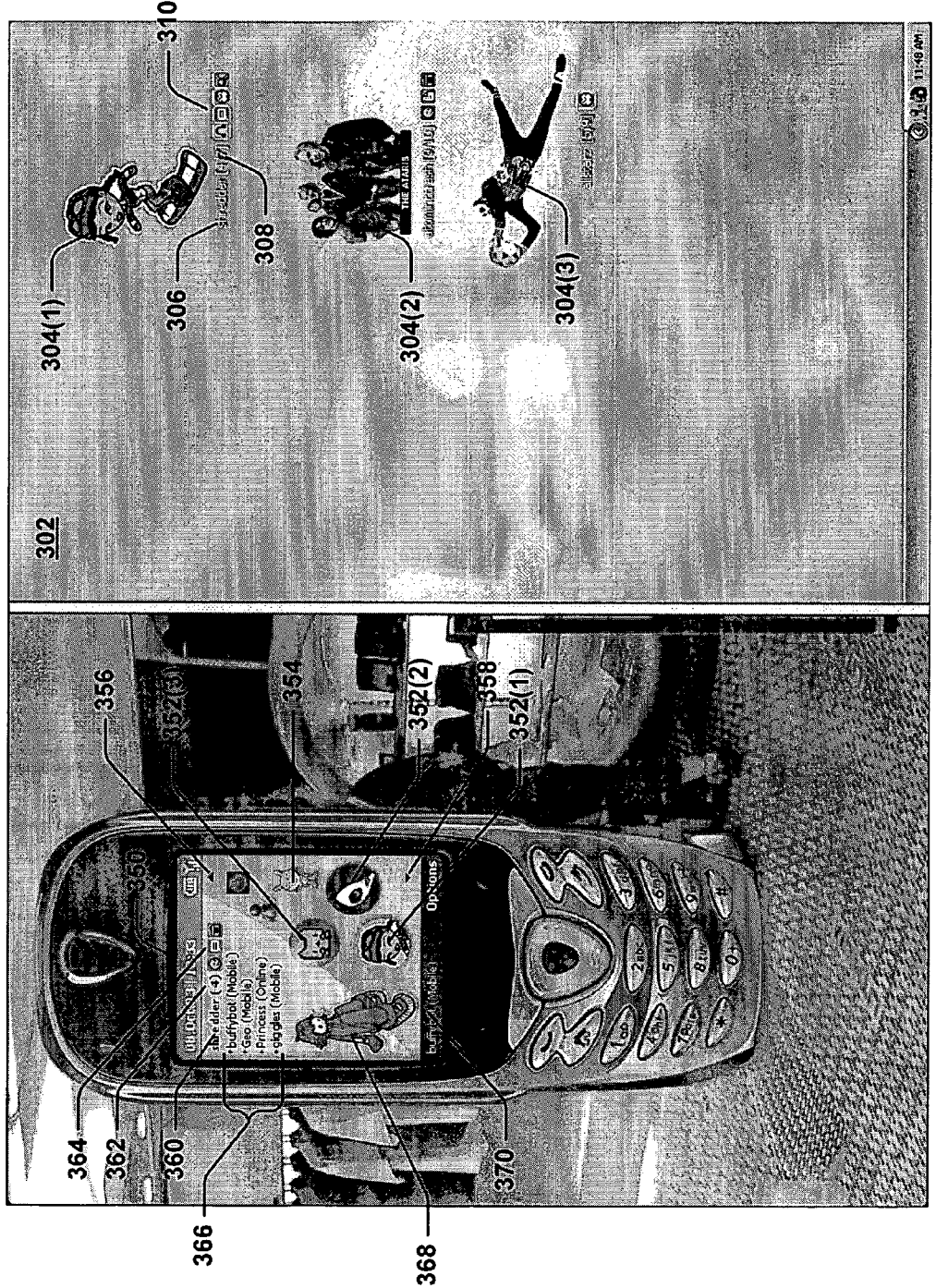
FIG. 3 is a display screen representation of an exemplary non-mobile device shared group experience user interface and a corresponding exemplary mobile device shared group experience user interface.

FIG. 3 illustrates an example user interface that may be rendered on a mobile device to enable a user to participate in shared group interactions, and a corresponding user interface that may be rendered on a non-mobile device. Non-mobile device user interface 302 includes group icons 304(1), 304(2), and 304(3), each of which represent a group to which the user currently logged onto the non-mobile device is a member. Associated with each group icon is a group name, presence information associated with members of the group, and activity notification icons associated with the group. For example, group icon 304(1) represents a group named "shredder", as indicated by group name 306. Shredder group presence information 308 indicates that the shredder group includes seven members, four of whom are currently online.

Shredder group activity notifications 310 represent activities that one or more members of the group are currently participating in. Activity notifications 310 are shared, and appear to each member that is currently online.

Furthermore, in an exemplary implementation, although not illustrated, a history of group activity may be maintained and accessible by any member of the group. For example, the history function enables a user to "catch up" by reviewing group social interactions that have taken place while the user was logged off or otherwise unavailable. In the described exemplary implementation, group history notifications are available to users who are logged on via a mobile device or a non-mobile device. However, the amount or detail of the history notifications may be limited for users of a mobile device due to storage or bandwidth limitations. For example, a user on a mobile device may only be able to view the 15 most recent historical group interactions, but when logged on using a non-mobile device, the user has access to all of the available historical data.

A similar mobile device user interface 350 is also illustrated in FIG. 3. Mobile device user interface 350 includes one or more group icons 352(1), 352(2), 352(3). Mobile device user interface 350 may also include one or more individual icons, such as individual icon 354. Individual icons may represent, for example, individuals who are on the current user's instant messaging buddy list and who are currently online. A user can scroll through icons that are displayed, for example, by selecting scroll arrows 356 and 358. Other methods may also be used to scroll data on the screen, for example, specific buttons on the mobile device may be pressed to cause data on the screen to be scrolled. A user's social network is visually represented with group icons and individual avatars. The visual representation of the social network may be customized based on, for example, filtering preferences.

For example, in an exemplary implementation, group and individual icons may be filtered and/or arranged, at least in part, based on geographic data that describes the physical locations of one or more group members. For example, icons can be filtered so that only individuals who are mobile or groups with members who are mobile are displayed, and the icons at the bottom of the screen may be rendered larger than icons nearer the top of the screen to present a graphical perception of nearness. For group members using a mobile device with an embedded global positioning system (GPS), location information can be used to organize the group icons. This may be useful, for example, if one group member is shopping and finds a dress that she wants someone else to come look at. If the icons are displayed in an arrangement that indicates which other group members are closest (e.g., around the corner at a coffee shop as opposed to across town), she can contact those individuals and ask them to meet her at the store.

In an alternate implementation, individual and/or group icons may be filtered and/or arranged based on recent or frequent interaction. For example, a user may be a member of six groups and also have a relationship with three individuals. If only six icons can be displayed at a time, the icons may be filtered or arranged so that the six icons associated with the groups or individuals that the user interacts with most frequently (or has interacted with most recently) are displayed first.

In the illustrated example, the icon that is located closest to the bottom of the screen is currently selected. Data associated with a currently selected group icon 352(1) is displayed in the upper left portion of mobile device user interface 350. Similar to non-mobile device user interface 302, mobile device user interface 350 displays a group name 360, presence information 362, and activity notification icons 364 associated with the selected group. Additional presence information 366 may also be displayed that indicates which group members are online and of those, which are connected using a mobile device. Furthermore, mobile device user interface 350 also displays an avatar and presence information associated with the user of the mobile device. Avatar 368 is a visual representation of the user, which is displayed to other users with whom the current user is communicating. User presence information 370 displays the presence information that is displayed to other users in association with the current user.

Figure 4:
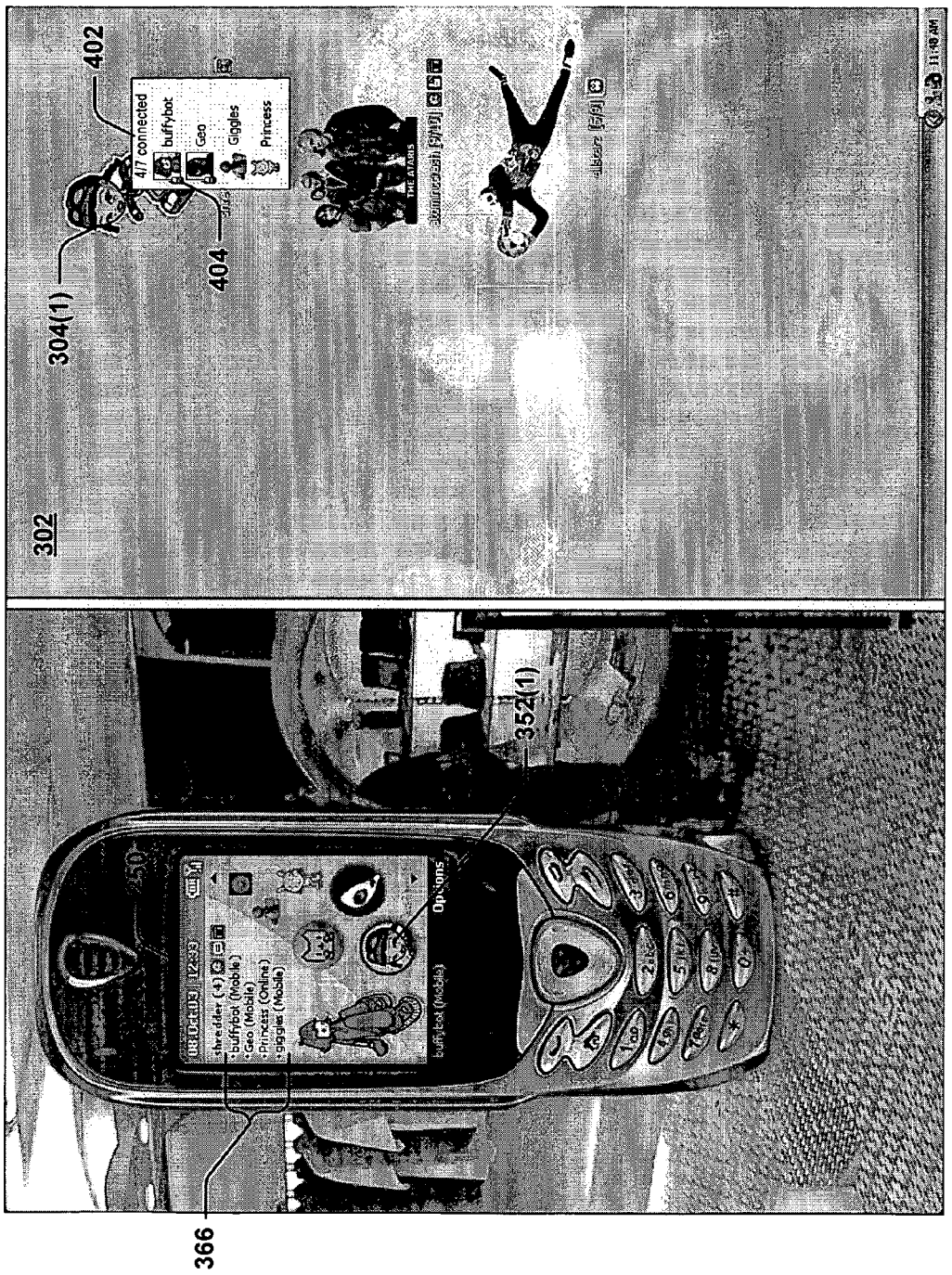
FIG. 4 is a display screen representation of group member presence information as rendered using an exemplary non-mobile device user interface.

FIG. 4 illustrates an exemplary display of detailed group presence information according to non-mobile device user interface 302. As described above, mobile device user interface 350 displays detailed group presence information 366 when a group icon is selected by scrolling it to the bottom most position of the screen. In the described exemplary implementation, more detailed presence information for each online group member may be accessed using non-mobile device user interface 302 by mousing over the group icon 304(1). When a user mouses over a group icon 304(1), a presence display box 402 appears that lists the name of each online group member, and for those members who are currently mobile, a mobile phone icon 404, or other type of mobile indicator.

Figure 5:
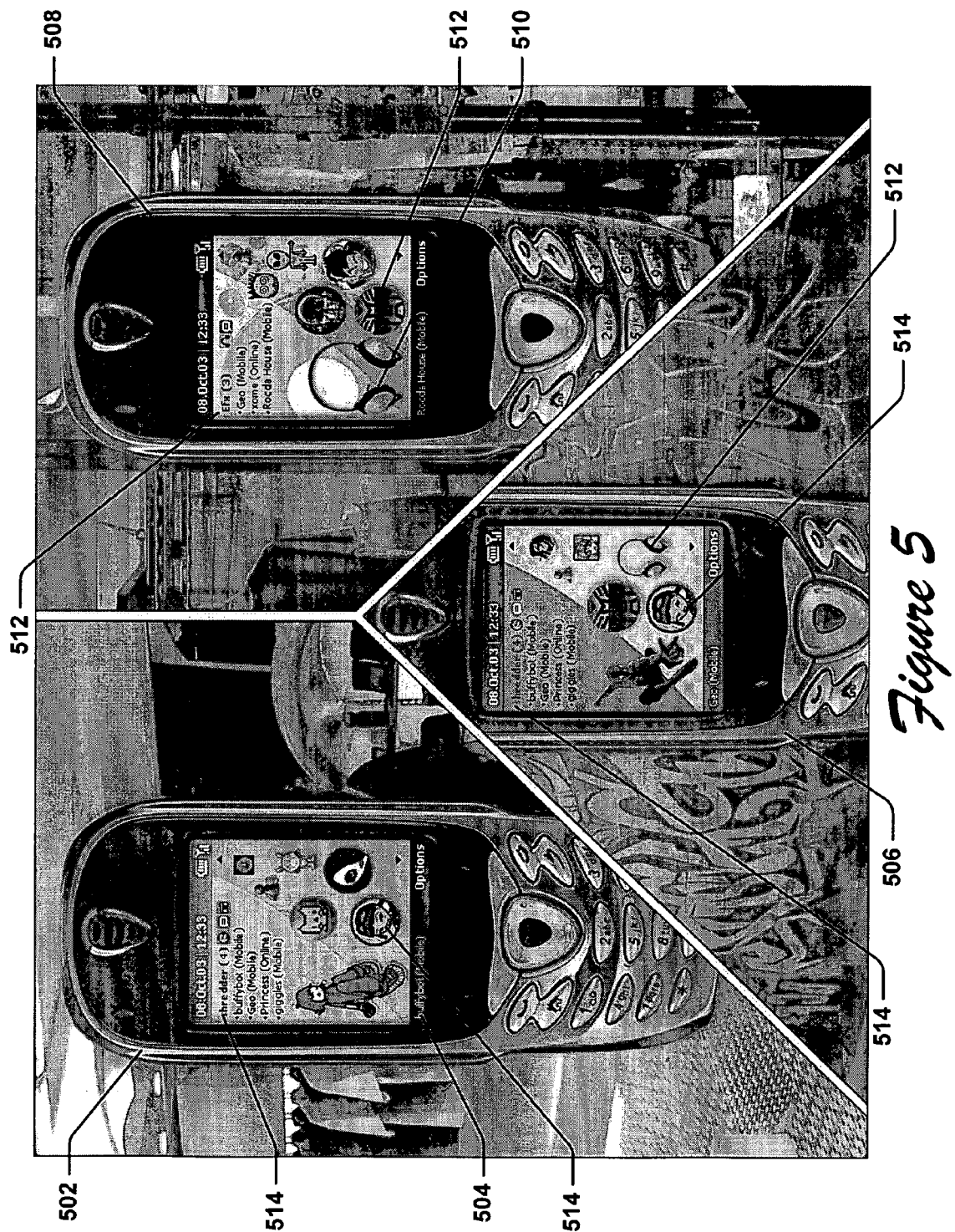
FIG. 5 is a display screen representation that illustrates a mobile device user interface as displayed to three different users.

FIG. 5 illustrates a mobile device user interface as displayed to three different users. The illustrated screen displays show that users can belong to more than one group, and that when a user is logged on, they automatically appear online to other members of each group that they belong to. That is, a user is not limited to participation in only one group at a time.

The user of mobile device 502 has username "buffybot" as indicated by the username 504. Similarly, the user of mobile device 506 has username "Geo", and the user of mobile device 508 has username "Rocda House". Rocda House uses an image of headphones 510 to represent himself. Geo and Rocda House are members of a two-member group, as indicated by the headphone icon 512 on Geo's display. Geo and Rocda House are also members of the Efx group 512 that is currently selected on Rocda House's display. Similarly, buffybot and Geo are both members of the shredder group 514 that is selected on both buffybot's user interface and Geo's user interface.

Figure 6:
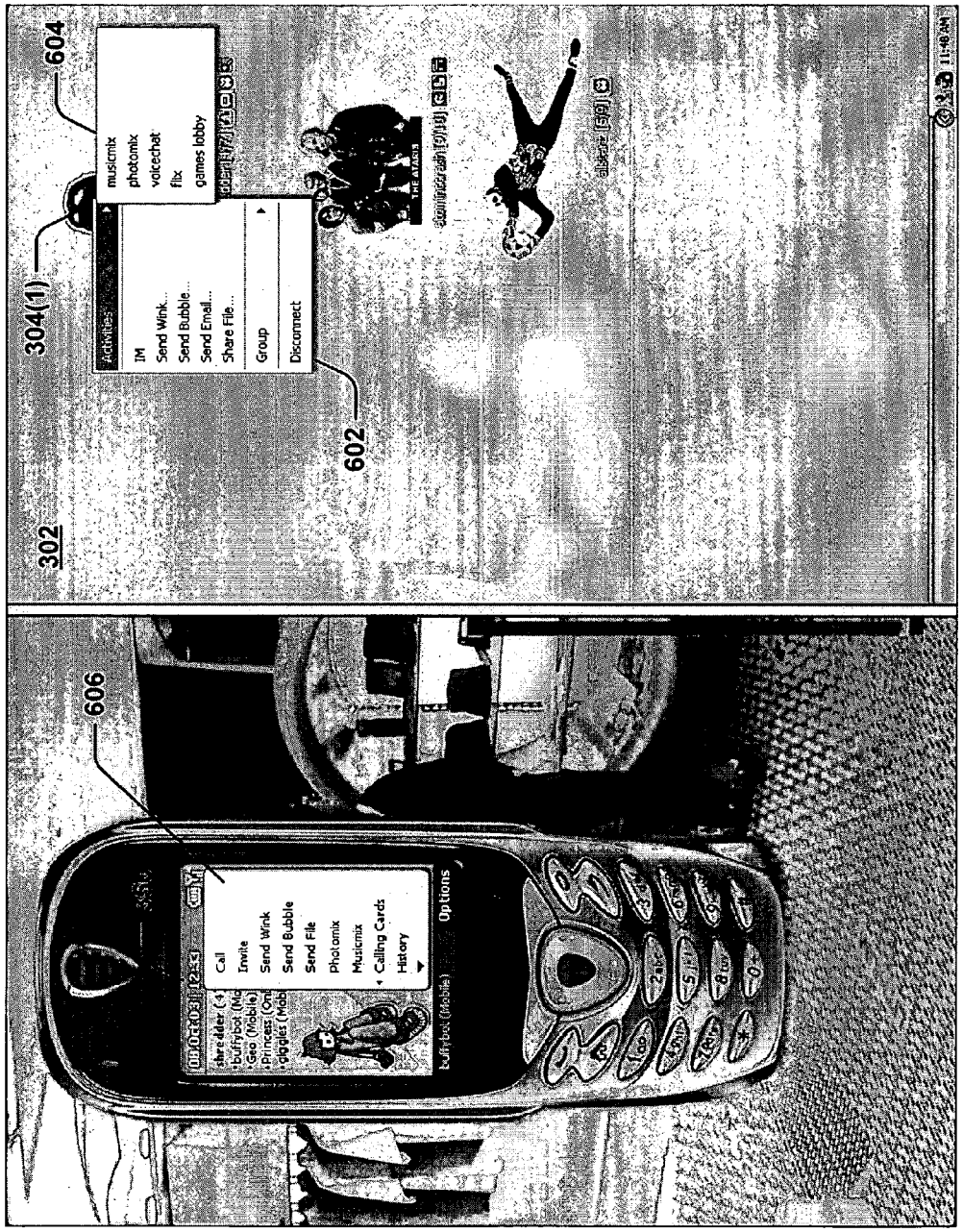
FIG. 6 is a display screen representation of an exemplary group activities menu as rendered using an exemplary non-mobile device user interface and a corresponding exemplary mobile device user interface.

FIG. 6 illustrates a non-mobile device user interface group activity menu and a corresponding mobile device user interface group activity menu. In the described implementation, when a user of non-mobile device user interface 302 right clicks on a group icon 304(1), a group activity menu 602 is displayed. Group activity menu 602 includes a list of actions that can be performed in association with the group, such as activities, instant messaging (IM), sending a wink, sending a bubble, sending an email, and sharing a file.

Selection of the instant messaging menu item launches an instant messaging window that is visible to all of the group members who are online.

Selection of the "send wink" menu item launches a wink selection window through which a user can select or create a wink, which is a visual expression that, when selected, is sent to all members of the group. Winks may be static visual images, short video clips, or short animations. Furthermore, winks may also have an associated audio component that plays while the visual portion of the wink is rendered. Winks may be used to simultaneously express a user's mood or opinion to all members of the group. For example, a particular user may always send a wink that includes a yellow smiley face image and an audio portion that states, "Have a nice day!" every time they log off, as a way of sending a pleasant "goodbye" message to all of their friends who are still online.

In an exemplary implementation, to support mobile group members, large winks (e.g., winks that include a large graphics and/or audio component) may have an associated smaller version that can be sent to mobile group members. For example, a smaller version of a wink that includes a video component may have a static image instead of the video component. In this way, mobile users can participate in group activities while restricted by bandwidth and/or storage limitations.

Selection of the "send bubble" menu item launches a bubble creation window through which a user can enter a text message to be simultaneously sent to all members of the group. Bubbles are described in further detail below with reference to FIG. 7.

Selection of the "send email" menu item launches an email composition window through which a user can compose an email message to be simultaneously sent to all members of the group.

Selection of the "share file" menu item enables a user connected via a broadband connection to make a file available for other group members to download.

In the illustrated example, group activities are further listed in activity menu 604, which includes musicmix, photomix, voicechat, flix, and games lobby. Selection of the musicmix menu item launches a shared music listening activity through which all group members can simultaneously listen to the same music selections. An example musicmix implementation is described in further detail below with reference to FIG. 13.

Selection of the photomix menu item launches a photo sharing activity through which all group members can simultaneously view and edit one or more photos. An example photomix implementation is described in further detail below with reference to FIGS. 8-11.

Selection of the voicechat menu item launches a chat activity, similar to a telephone conference call, through which all group members can talk to one another. In an exemplary implementation, a voicechat activity may include mobile and/or non-mobile users.

Selection of the flix menu item launches a video clip sharing activity via which group members can simultaneously view, comment on, and/or edit short video clips. For example, a mobile user may capture a short video clip using a video-enabled cellular telephone, and then launch flix to share the video clip with other members of a group. Similarly, a user who is connected via a non-mobile device may launch flix to share with a group, a video clip stored on the user's PC hard drive. In an exemplary implementation, video clips shared from a non-mobile device may be compressed or otherwise altered to improve the transfer speed or viewing ability for mobile members of the group.

Selection of the "games lobby" menu item enables a group member to launch a game in which other members of the group can participate. In an exemplary implementation, a listing of available games, members' scores and trophies may be accessed through the games lobby. In an exemplary implementation, a mobile group member may see a different list of available games than a non-mobile group member. For example, a location-based treasure hunt game may be available to mobile group members, but not available to non-mobile group members.

Selection of the "group" menu item enables a group member to modify group settings, such as the group name, the group icon, and the group skin. Menu items may also be available that allow a member to invite another individual to join the group, or to enable a group member to remove themselves from the group.

A group member who is connected to the group via a mobile device can access mobile device user interface group activity menu 606 that corresponds to non-mobile device user interface group activity menu 602. The user may access mobile device user interface group activity menu 606, for example, by pressing a particular button on the mobile device while a particular group icon is selected.

The menu items displayed in mobile device user interface group activity menu 606 may be the same as, or may differ from, those displayed in non-mobile device user interface group activity menu 602. For example, due to mobile device memory constraints, bandwidth constraints, and/or limited screen size, group activities that are available to a group member that is logged on using a non-mobile device may not be feasible for a group member that is logged on using a mobile device. Accordingly, menu items for those activities may be displayed on non-mobile device user interface group activity menu 502, but not on mobile device user interface group activity menu 506. Similarly, there may be menu items that are available to group members that are logged on using a mobile device that are not available to group members that are logged on using a non-mobile device.

For example, mobile device user interface group activity menu 606 does not include a "share file" entry because making a file available for others to download from a mobile device may not be practical. However, mobile device user interface group activity menu 606 does include a "send file" entry, selection of which enables the mobile user to send a particular file directly to one or more group members.

In an alternate implementation, a share file activity may be available from both a mobile device and a non-mobile device, depending, for example, on available bandwidth and memory resources.

Although not shown, another group activity that may be available is a "push-to-talk" activity that enables a group member to talk with other mobile group members as if using a walkie-talkie. In an exemplary implementation, a "push-to-talk" activity may be available to mobile and non-mobile group members. Alternatively, a "push-to-talk" activity may be available only to mobile group members.

Figure 7:
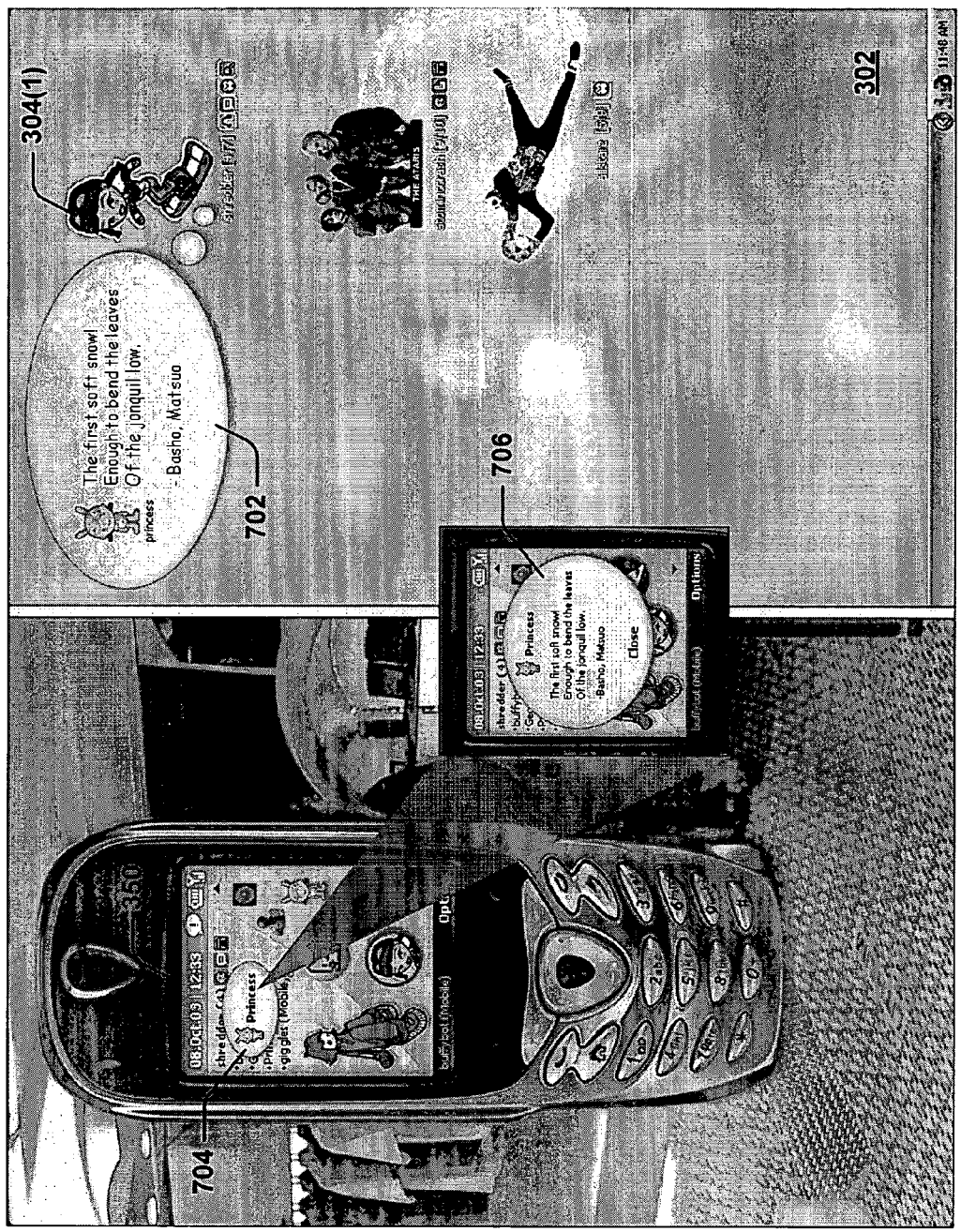
FIG. 7 is a display screen representation of an exemplary bubble message as rendered using an exemplary non-mobile device user interface and a corresponding exemplary mobile device user interface.

FIG. 7 illustrates an exemplary implementation of a shared group bubble activity. As describe above with reference to FIG. 6, members of a group, when logged on, may simultaneously send a bubble text message to each member of the group. The right hand side of FIG. 7 illustrates how, according to the illustrated implementation, such a bubble text message 702 may be displayed according to non-mobile device user interface 302.

Similarly, the same bubble text message, when received by a group member using a mobile device, may also be displayed according to mobile device user interface 350. Bubbles can be thought of as gifts that are sent, and need to be opened. Accordingly, bubble text message notification 704 includes an icon that identifies the group member who sent the bubble text message. When a user selects the bubble text message notification 704 (e.g., by pressing a designated button on the mobile device), bubble text message 706 is displayed. In an exemplary implementation, some bubble templates may be optimized for either mobile or non-mobile devices, while others may be optimized for non-mobile devices. Bubble templates optimized for non-mobile devices may have an associated smaller version that is transmitted to mobile group members when the bubble template is used to send a message.

Figure 8:
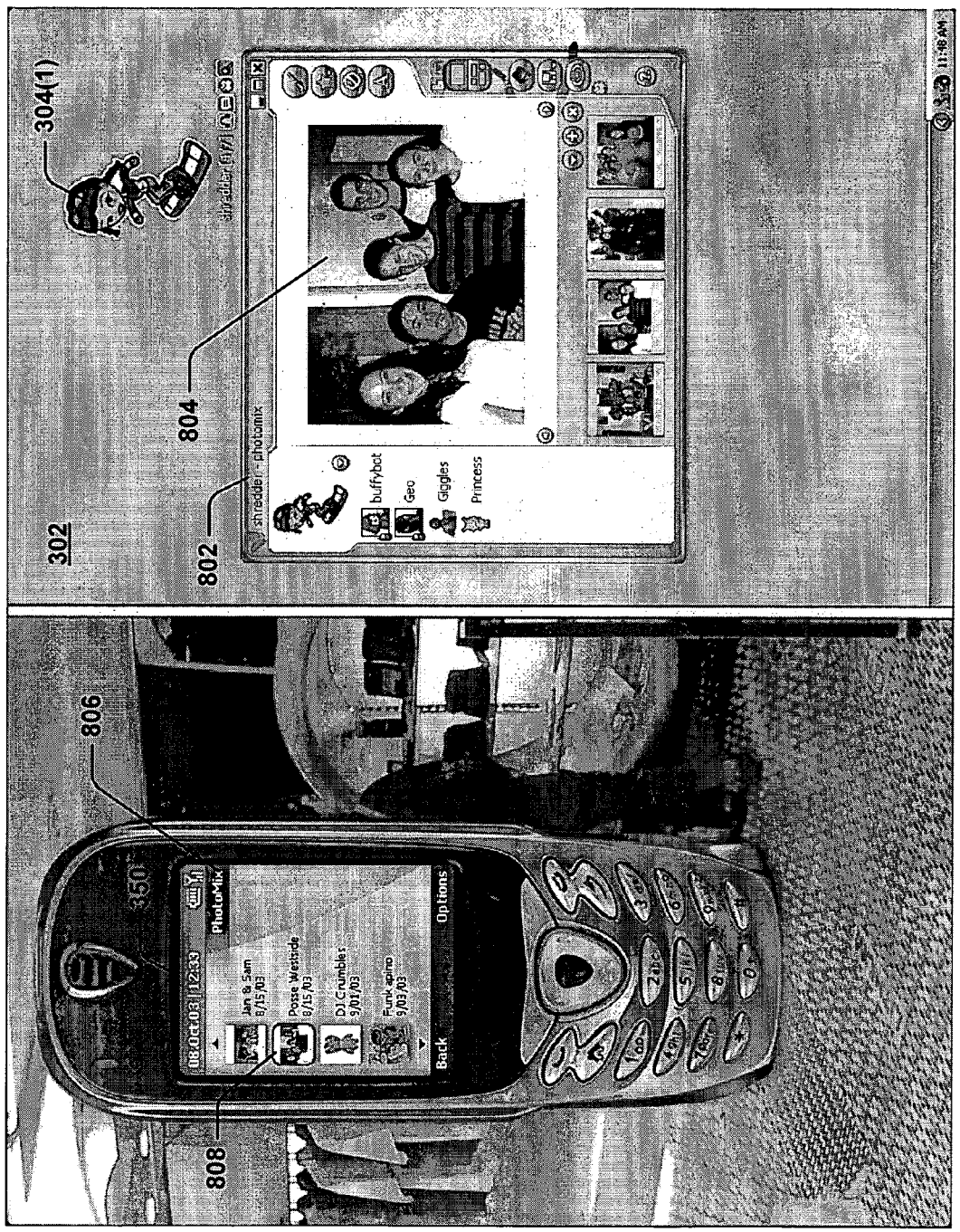
FIG. 8 is a display screen representation of an exemplary group photo sharing activity as rendered using an exemplary non-mobile device user interface and a corresponding exemplary mobile device user interface.

FIG. 8 illustrates an exemplary implementation of a shared group photomix activity. As described above with reference to FIG. 6, members of a group, when logged on, may simultaneously view, edit, and comment on one or more photos. The right hand side of FIG. 8 illustrates how, according to the illustrated implementation, such a photomix activity 802 may be displayed according to non-mobile device user interface 302. The particular photo that is being viewed 804 is displayed within the photomix activity window 802.

Similarly, the same photo that is being viewed by group members through non-mobile device user interface 302 can also be viewed by mobile group members through mobile device user interface 350. In an exemplary implementation, to conserve bandwidth and memory, a photo (or any other image) may be resampled and/or resized (or otherwise altered to make the image smaller) before it is sent to the mobile device. The left side of FIG. 8 illustrates an exemplary display of a group photomix activity 806 through mobile device user interface 350. The image 804 that is being viewed by the group is indicated in the mobile device user interface display of group photomix activity 806 as a highlighted thumbnail 808 of the image. In an exemplary implementation, a mobile group member can switch to a larger view of the image by selecting the highlighted image thumbnail 808.

Figure 9:
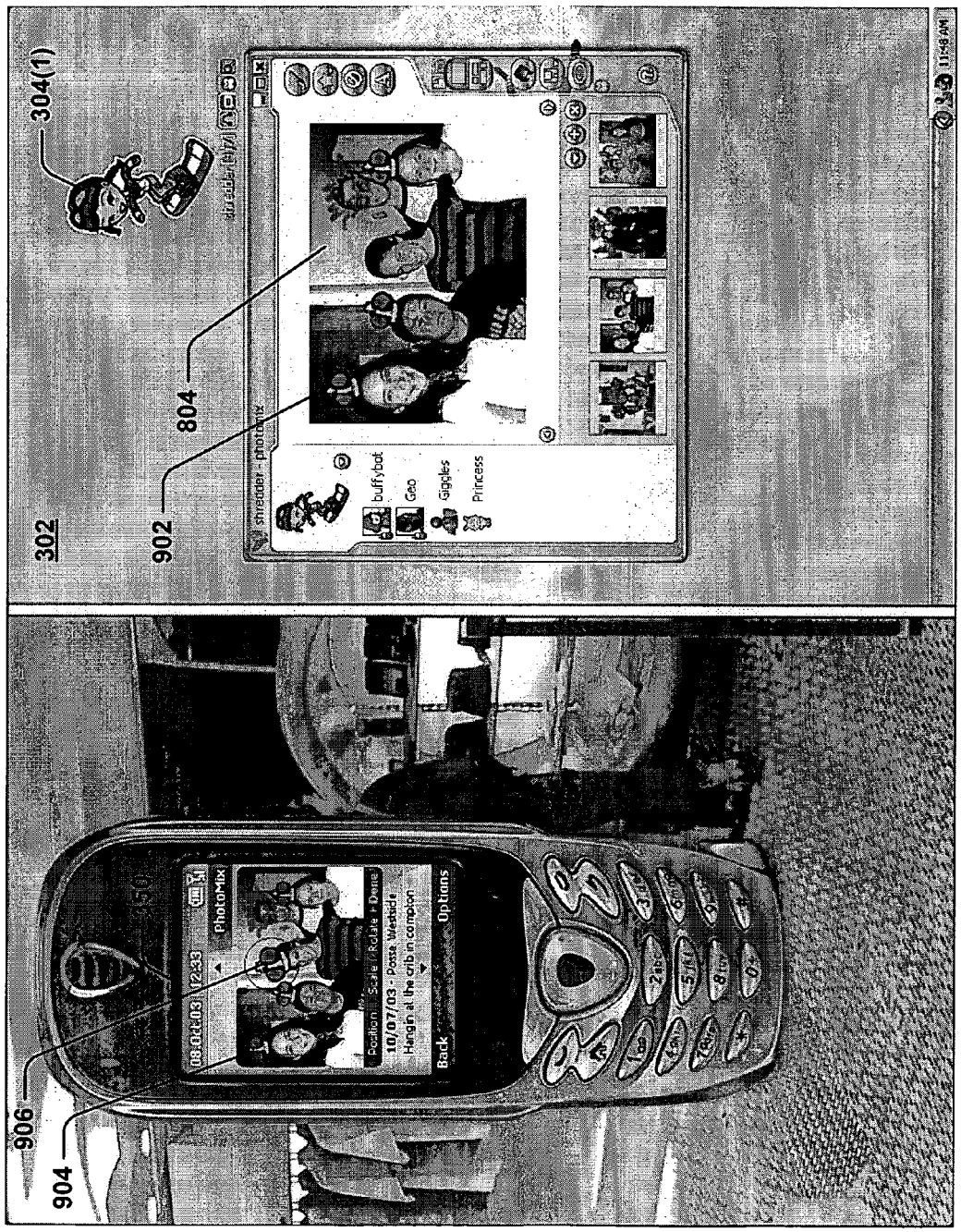
FIG. 9 is a display screen representation of an exemplary group photo editing activity as rendered using an exemplary non-mobile device user interface and a corresponding exemplary mobile device user interface.

FIG. 9 illustrates shared photo editing as can be performed according to a group photomix activity. The right side of FIG. 9 illustrates an exemplary screen display according to a non-mobile device user interface 302. A user can edit the photo 804 currently being viewed by the group, for example, by adding a sticker 902 (i.e., a small graphical element that can be "pasted' onto an image) or by using a pen tool to draw on the drawing. Any edits made to the image by one group member are automatically visible to the other group members. This is illustrated on the left-hand side of FIG. 9, which represents a mobile device user interface 350 for enabling a group member to participate in a group photomix activity. The sticker 902 that was added by the user of non-mobile device user interface 302 is also visible as sticker 904 to the user of mobile device user interface 350. The group member who is using mobile device user interface 350 may also add stickers, or otherwise edit the photo. For example, sticker 906 may be added to the photo using mobile device user interface 350. After sticker 906 is added, it will automatically be visible to other online group members.

Figure 10:
FIG. 10 is a display screen representation illustrating image acquisition and association of location data with an image as rendered using an exemplary mobile device user interface.

FIG. 10 illustrates example actions that can be performed in association with a shared image through mobile device user interface 350. The left side of FIG. 10 illustrates a photomix menu 1002 that may be displayed using mobile device user interface 350. Photomix menu 1002 includes selectable menu items that enable a user to update an image, add an image, add a comment to an image, add location information associated with an image, add a border to an image, add stickers to an image, add a vote to an image, save an image, or delete an image. As illustrated in FIG. 10, an image may be acquired from a digital camera, which may be an integrated component of the mobile device, or from an image library, which may be stored on the mobile device or in a separate repository that can be accessed via the mobile device.

The right side of FIG. 10 illustrates the association of location information with an image. For example, when a user, using a camera phone, takes a photo to share with the group, the user can associate location information with the image to indicate to the other group members where the picture was taken. In an exemplary implementation, location information may be added automatically using a geographic positioning system (GPS) component that is an integrated part of the mobile device. Alternatively, the user may access an online map for which a link can be associated with the image. Additionally, if multiple images are available, each with associated location information, a map may be displayed with the location associated with each image highlighted or otherwise indicated.

Figure 11:
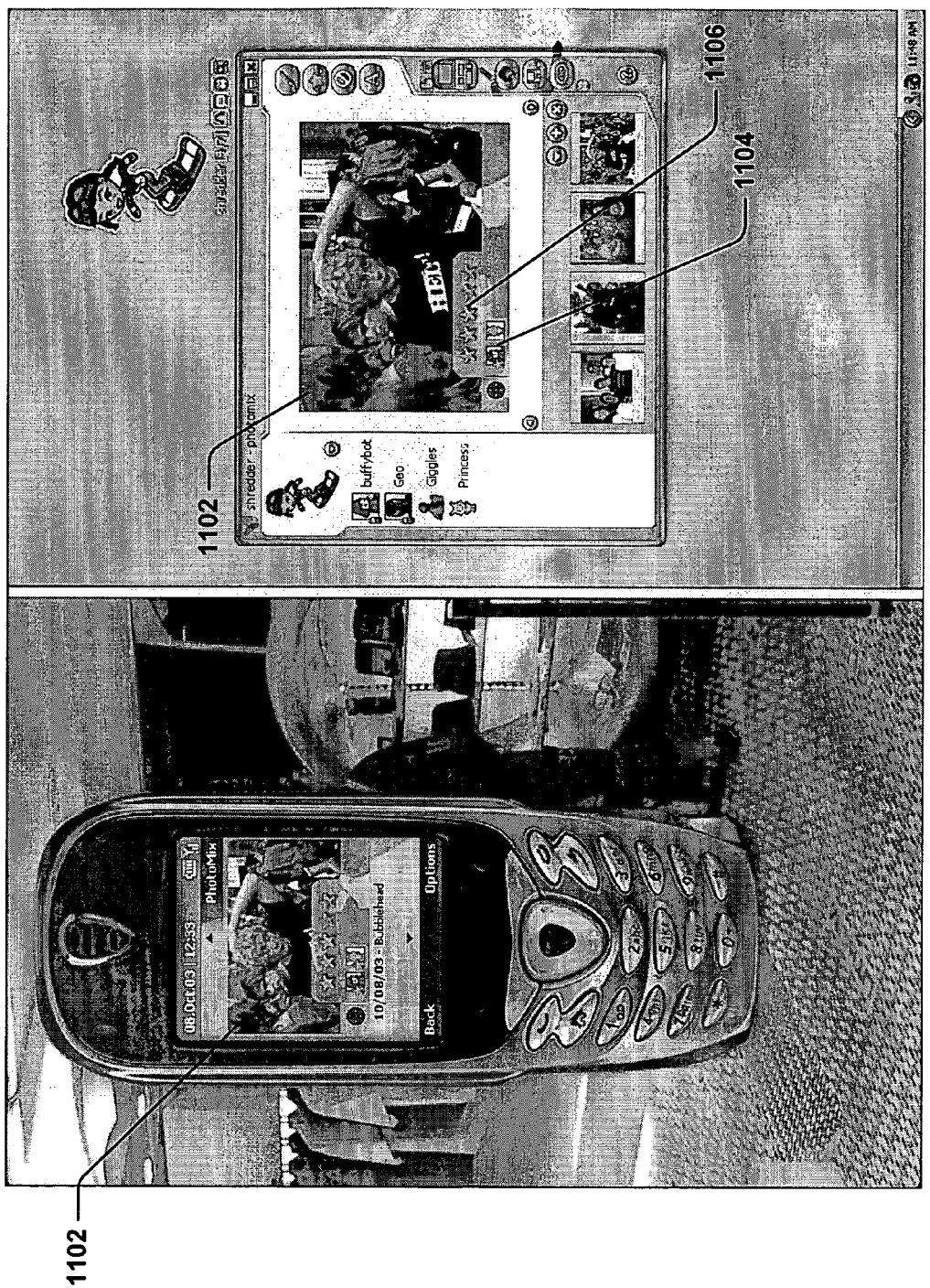
FIG. 11 is a display screen representation of an exemplary group voting activity applied to an image as rendered using an exemplary non-mobile device user interface and a corresponding exemplary mobile device user interface.

FIG. 11 illustrates an exemplary group voting activity that may be associated with an image. For example, if a mobile group member sees a cute guy and wants her friends to rate him based on how cute they think he is, the mobile group member can take a picture of him, add the photo 1102 to a photomix activity, and then associate a group voting activity with the image. The right side of FIG. 11 illustrates an exemplary non-mobile device user interface display of a photomix image 1102 that has an associated voting activity. In the illustrated example, the photo has an average rating of three out of five stars, and has been voted on by two group members, as indicated by the group member avatars 1104 displayed below the star rating 1106. In an exemplary implementation, a user can see how a particular group member rated the photo by selecting one of the group member avatars 1104. The rating submitted by the user associated with the selected avatar would then be displayed. The left side of FIG. 11 illustrates a corresponding exemplary mobile device user interface display of the same photo and the associated group voting activity.

Figure 12:
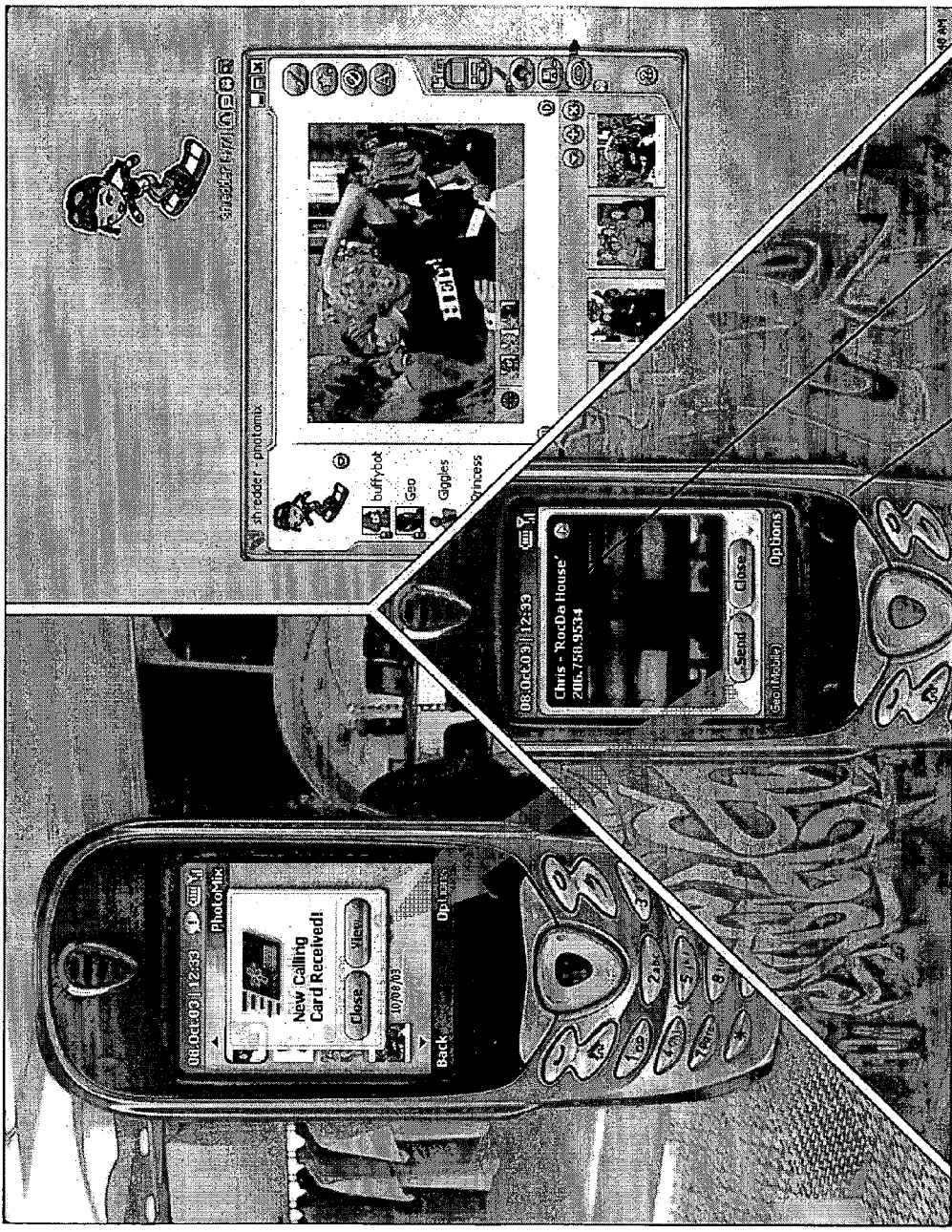
FIG. 12 is a display screen representation of an exemplary calling card introduction as rendered using an exemplary mobile device user interface.

FIG. 12 illustrates an exemplary user interface that enables one group member to introduce a third party to another group member. For example, as described above and illustrated with reference to FIG. 11, a group member may take a picture of someone and share that photo with the group. FIG. 12 illustrates an interaction that may take place in a scenario in which one of the group members happens to be friends with the individual in the photo. In the illustrated example, the user of mobile device 1202 (username "Geo") belongs to another group that includes the individual whose photo was taken and shared. Based on that group connection, Geo may forward a calling card 1204 associated with "RocDa House" (the username of the individual in the photo) that includes personal information that user RocDa House has decided to make public (e.g., a first name and a phone number). In an exemplary implementation a calling card may be sent to a particular individual or to a group, in which case the calling card is sent to each member of the group. A user who receives a calling card may then use that information to invite the individual identified by the calling card to join one or more groups that the user is a member of.

Figure 13:
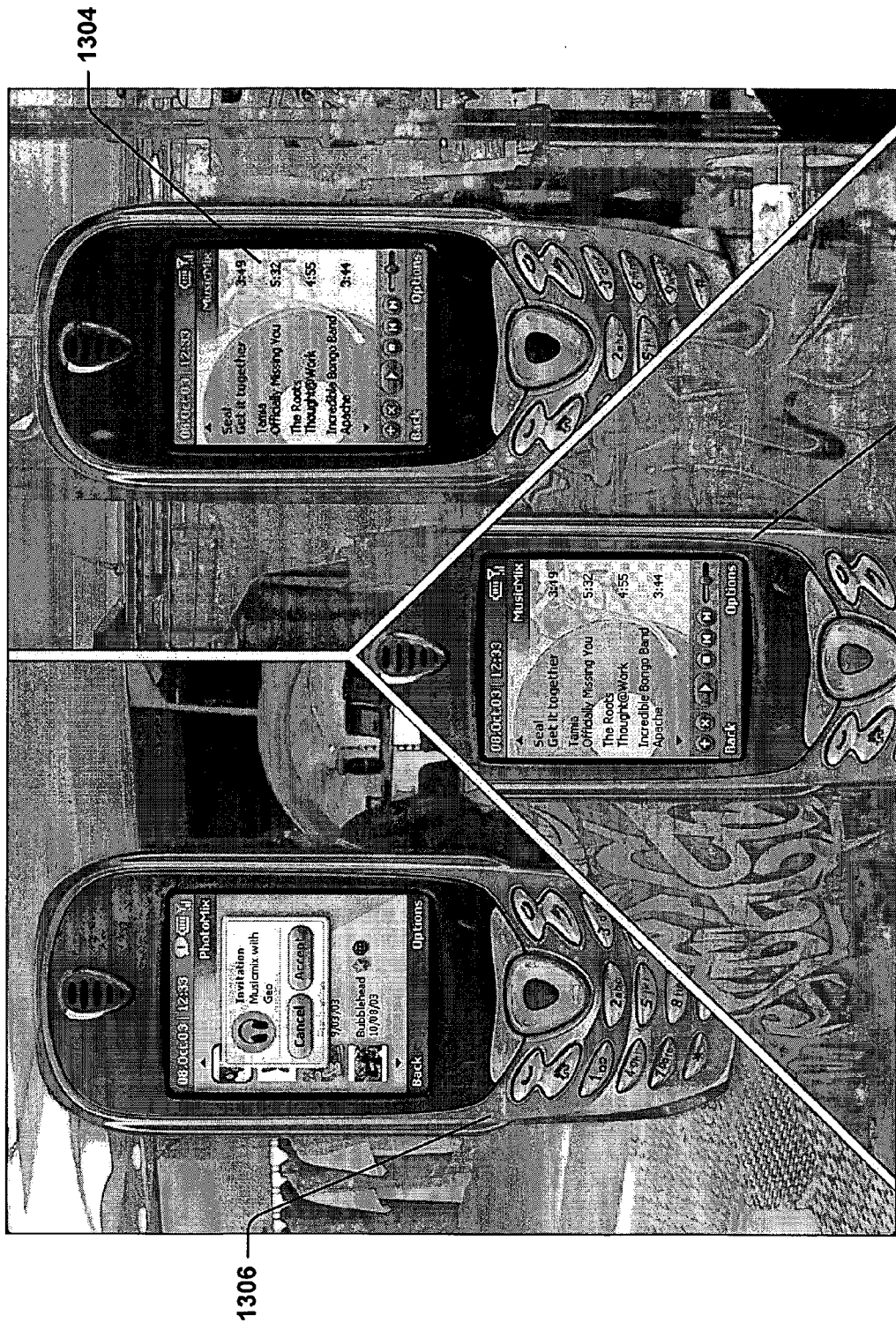
FIG. 13 is a display screen representation of an exemplary invitation for a third user to join a group musicmix activity being shared by two members of a group.

FIG. 13 illustrates an exemplary mobile device user interface component that enables a shared music experience. In the illustrated example, users of mobile devices 1302 and 1304 are members of the same group and are engaged in a musicmix activity. In an exemplary implementation, the playlist, song state, and background skin are shared, meaning that each group member participating in the musicmix activity hears the same song at the same time, sees the same background, and can select a different song from the same playlist. FIG. 13 also illustrates how a group member (e.g., user of mobile device 1302) can invite another individual (e.g., user of mobile device 1306) to join in the music mix. By inviting an individual from outside the group, if the individual accepts the invitation, they become a member of the group.

Mobile Online Group Interaction Method

Figure 14:
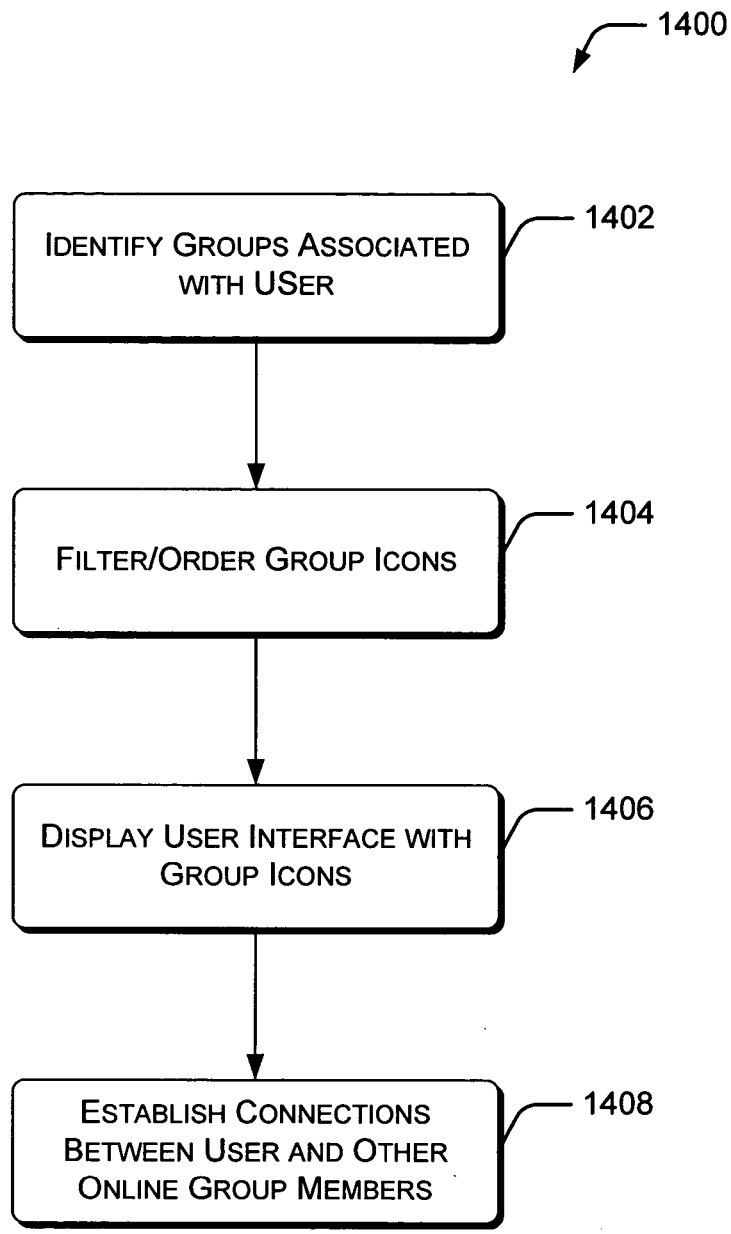
FIG. 14 is a flow diagram of an illustrative process for a mobile shared group interaction.

FIG. 14 is a flow diagram that illustrates an exemplary method 1400 for enabling mobile online group interaction. The illustrated process can be implemented in any suitable hardware, software, firmware or combination thereof.

At block 1402, an application identifies groups in which the user is a member. For example, social group application 214 identifies the groups in which the user is a member.

At block 1404, the application may filter and/or order group icons associated with the groups in which the user is a member. For example, if screen real estate is limited such that only six group icons can be displayed, but the user belongs to more than six groups, then the icons that are displayed may be associated with those groups the user communicates with most frequently.

Alternatively, the group icons that are displayed may be associated with those groups for which online members of the group are located geographically closest to the user. In an exemplary implementation, geographic information may be gathered from users who are logged on using a device (mobile or non-mobile) that includes a global positioning system.

At block 1406, a user interface including one or more group icons is displayed. For example, mobile device 200 displays a user interface 350 associated with social group application 214.

At block 1408, a connection is automatically established between the mobile device and devices being used by other members of the groups represented by the displayed group icons. For example, a peer-to-peer connection is established between the mobile device and another mobile device being used by another member of a group associated with a displayed group icon, and/or a peer-to-peer connection is established between the mobile device and a non-mobile device being used by another member of a group represented by a displayed group icon. Connections are automatically established between the mobile device and any device (mobile or non-mobile) being used by any other member of any group to which the user of the mobile device is a member.

A user may then participate in social group interactions over the established connections as enabled by social group application 214.

CONCLUSION

The systems and methods described above enable mobile group social interaction. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system, comprising:
   a processor;
   a memory; and
   a group interaction application maintained in the memory and executed on the processor to present a graphical user interface for facilitating a group interaction among a first user and one or more other users, the graphical user interface comprising:
      a group identification area configured to display visual representations of a plurality of online social groups in which the first user is a member, wherein:
         the first user's membership in the group is maintained when the first user is offline; and
         the visual representations of online social groups are automatically arranged by at least one of:
            a geographic location associated with a member of one of the online social groups;
            a date and time of a most recent communication between the first user and another member of one of the online social groups; and
            a frequency of communication between the first user and another member of one of the online social groups,
         wherein the visual representations of online social groups are filtered, at least in part, based on geographical location information associated with one or more members of the online social groups; and
      a group activities menu comprising a plurality of selectable items representing social activities in which the first user, as a member of a selected group may participate, such that a plurality of group activities in which a member of the selected group who is logged on via a mobile device may participate is different than a plurality of group activities in which a member of the selected group who is logged on via a non-mobile device may participate,
   wherein the social activities in which a mobile member of the selected group may participate comprise a group of activities that are available to group members who are mobile but that are not available to a group member who is logged on via a non-mobile device.

2. The system as recited in claim 1, wherein a selected group is represented by one of the visual representations, and wherein the graphical user interface further comprises a group details area configured to display a group name associated with the selected group.

3. The system as recited in claim 1, wherein the visual representations of online social groups are filtered, at least in part, based on frequency of communication between the first user and one or more members of the online social groups.

4. The system as recited in claim 1, wherein the visual representations of online social groups are filtered, at least in part, based on a date and time of a most recent communication between the first user and one or more members of the online social groups.

5. The system as recited in claim 1, wherein the graphical user interface further comprises a personal representation area configured to display a configurable avatar associated with the first user.

6. The system as recited in claim 5, wherein the avatar comprises a visual representation of the first user that is displayed to other online members of online social groups to which the user belongs.

7. The system as recited in claim 5, wherein the avatar comprises a visual representation of the first user that is displayed to other online individuals with which the first user has a relationship.

8. The system as recited in claim 5, wherein the personal representation area is further configured to display a username and presence information associated with the first user, wherein further the username and presence information may be displayed to other online members of online social groups to which the user belongs.

9. The system as recited in claim 5, wherein the personal representation area is further configured to display a username and presence information associated with the first user, wherein further the username and presence information may be displayed to other online individuals with which the first user has a relationship.

10. The system as recited in claim 5, wherein the personal representation area is further configured to display a username associated with the first user.

11. The system as recited in claim 1, wherein the graphical user interface further comprises a group details area configured to display data associated with a selected one of the plurality of online social groups.

12. The system as recited in claim 11, wherein the data associated with the selected one of the plurality of online social groups comprises at least one of a group name associated with the selected group, presence information associated with the selected group, presence information associated with online members of the selected group, and a visual representation of an activity in which one or more online members of the selected group are participating.

13. The system as recited in claim 1, wherein the social activities represented by the selectable items of the group activities menu are selected from a group of social activities comprising calling, inviting, sending a wink, sending a bubble, sending a file, sharing an image, sharing audio, sending a calling card, and viewing group history.

14. The system as recited in claim 1, wherein the non-mobile device comprises a desktop computer system.

15. The system as recited in claim 1, wherein the non-mobile device comprises a desktop computer system.

16. The system as recited in claim 1 implemented as a mobile device.

17. The system as recited in claim 16, wherein the mobile device comprises at least one of a cellular telephone, a personal digital assistant, a car stereo system, a portable television, a portable DVD player, a portable stereo system, a wearable computing device, a watch, a bracelet, a necklace, a pendant, and a digital picture frame.

18. One or more computer-readable media storing computer-readable instructions which, when executed by a processor of a mobile device, cause the mobile device to perform a method, the method comprising:
   presenting a graphical user interface that displays:
      an avatar implemented as a visual representation of a user of the mobile device, wherein the avatar is displayed to other online members of peer-to-peer online social groups to which the user belongs; and
      visual representations of a plurality of peer-to-peer online social groups to which the user belongs, wherein each of the peer-to-peer online social groups comprises two or more members,
   wherein:
      individual ones of the two or more members may be offline, and therefore not available for social interaction via the group;
      the visual representations of the plurality of groups are arranged based on at least one of:
         a relationship between geographic locations associated with the groups;
         a date and time of a most recent group communication involving the particular user; and
         a frequency of communication between a first member of the groups and other members of the groups; and
      the visual representations of the plurality of groups are filtered based on:
         a relationship between geographic locations associated with the groups;
      automatically establishing a connection between the computer system being used by the particular user and a computer system being used by another member of at least one group of the plurality of groups;
      in response to receiving a user selection of a particular one of the visual representations of the online social groups, displaying a collection of a plurality of selectable items, each representing a social activity in which the user may participate as part of the online social group represented by the particular one of the visual representations of the online social groups, wherein the collection of one or more selectable items, each representing a social activity is different than a collection of social activities available to another member of the same online social group who is using a non-mobile device,
      wherein the social activities in which a mobile member of the selected group may participate comprise a group of activities that are available to group members who are mobile but that are not available to a group member who is logged on via a non-mobile device.

19. The one or more computer-readable media as recited in claim 18 wherein the computer system comprises a mobile device.

20. The one or more computer-readable media as recited in claim 18, further comprising computer-readable instructions which, when executed, cause the mobile device to further:
   receive a user selection of a graphical element and an audio element; and
   transmit the graphical and audio elements to a group member such that in an event that the group member is online, the graphical and audio elements are automatically presented to the group member.

* * * * *